3,373,136
3,5-DIOXABICYCLO(5.4.0) UNDECANE AND COPOLYMERS THEREOF
Thomas H. Wicker, Jr., Kingsport, Tenn., assignor to Eastman Kodak Company, Rochester, N.Y., a corporation of New Jersey
No Drawing. Filed Feb. 11, 1964, Ser. No. 343,964
11 Claims. (Cl. 260—45.9)

This invention relates to new and improved modified polyoxymethylene-type compositions, to the method for preparing the same, and to the modifying comonomers.

Polyoxymethylene polymers having recurring

—CH$_2$O— units have been known for many years. They may be prepared by the polymerization of anhydrous formaldehyde or by the polymerization of trioxane, which is a cyclic trimer of formaldehyde. These polymers vary in thermal stability and molecular weight, depending, for example, upon their method of preparation and the degree to which they are modified. Although the total disclosure of all of the prior art in this field represents vast achievement, the most direct, simple, versatile, and effective means for achieving high thermal stability along with other desirable properties for these polymers has not heretofore been evolved.

Objects of the invention, therefore, are: to provide polyoxymethylene-type compositions having significantly improved thermal stability; to further improve such properties of these polymers as resistance to acid and water attack, stiffness and dyeability; and to provide the means necessary to achieve these improvements.

These and other objects hereinafter becoming evident have been achieved in accordance with the present invention through the discovery that the copolymerization of formaldehyde with small amounts—from about 0.2 to about 10.0 mole percent—of the comonomer 3,5-dioxabicyclo(5.4.0) undecane having the formula

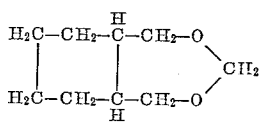

imparts the said desirable physical and chemical properties to the resultant polyoxymethylene.

This comonomer may conveniently be prepared by reacting 1,2-cyclohexanedimethanol with paraformaldehyde in the presence of an acidic catalyst such as p-toluenesulfonic acid using a solvent to effect azeotropic removal of water. Alternatively, the compound can be prepared by an acetal interchange reaction between 1,2-cyclohexanedimethanol and dimethyl formal.

The copolymers of the present invention may be obtained by copolymerizing 3,5-dioxabicyclo(5.4.0) undecane with formaldehyde or a suitable formaldehyde source in either batchwise or continuous solution, slurry, or non-solvent processes. Preferably, the comonomers are reacted in a common anhydrous solvent such as cyclohexane. Reaction temperatures may vary from −10° to 110° C., depending upon the source of formaldehyde used, and reaction times may vary from a few minutes to several hours. Pressures as high as 100 atmospheres may be used, but in most polymerizations, pressure does not play a significant role. The formaldehyde or source thereof such as trioxane employed should be substantially anhydrous.

The copolymers comprise the units

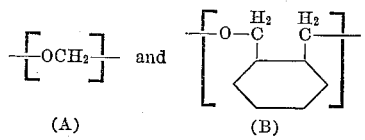

and critical polymer properties are governed by the number of moles of (B) units in the polymer chain. The number of (B) units in the polymer chain may vary, but are preferably present in the range of 0.2 to 10.0 mole percent of the total number of moles present. These copolymers are solid materials having melting points in excess of 155° C. As (B) unit content decreases, the melting point of the copolymer increases, but in general, polymer heat stability and resistance to the action of water and acids decreases.

The copolymers of this invention when prepared in batchwise reactions contain a small proportion of unstable polymer. It is desirable that this unstable polymer be removed before the polymer is subjected to commercial molding or extrusion operations. Removal of this unstable portion of the molecule can be accomplished by a simple heat treatment in which the unstable polymer is flashed off at a temperature of 200–220° C. under reduced pressure, or the polymer can be subjected to an acylation or other chemical reaction in which the unstable end groups are stabilized.

The stabilities of the polymers herein described were determined by a vacuum stability test which consisted of placing a 1-gram sample of the polymer in a small open-ended test tube which was then placed inside of a larger test tube sealed at the top and connected to vacuum (1–5 mm. Hg). The sample was then heated to a temperature of 222° C. for 1 hour, after which the percent weight loss was determined.

The melt stability ratio (which is preferably low) of the polymer is the ratio of the polymer melt flow determined at 230° C. after a heating period of five minutes to the melt flow determined at 230° C. after a heating period of 30 minutes. Polymers as herein prepared usually have a vacuum stability test result of less than about 25% per hour. Polymers which have been acylated or subjected to the heat treatment under vacuum usually have a vacuum stability test result in the range of 0.2 to 3.0.

The following examples further illustrate the invention.

EXAMPLE 1

Synthesis of 3,5-dioxabicyclo(5.4.0) undecane

In a one-liter, three-necked flask were placed 536.5 g. (3.72 moles) of 1,2,-cyclohexanedimethanol (having 95% transconfiguration), 111.5 g. (3.72 moles) of paraformaldehyde, 60 ml. of benzene, and 1.0 g. of p-toluenesulfonic acid monohydrate (catalyst). The mixture was brought to reflux and 69 ml. of water were removed via a Dean-Stark tube. The benzene was removed in a stripping operation and the product was distilled under reduced pressure; B.P. 47° C./1.4 mm.; $n_D^{25}$=1.4679. A gas chromatogram on the product showed that it contained 99.7% of product having the trans-configuration. It is noted that a wide range of acidic catalysts are effective in this reaction and include sulfonic acid ion exchange resin, d-camphorsulfonic acid, sulfosalicylic acid, zinc chloride, ferric chloride, and sulfuric acid. The temperature of reaction may vary between wide limits. However, the use of azeotrope-forming solvents such as benzene, toluene, and xylene, and temperatures from about 60° to about 100° C. are prepared.

EXAMPLE 2

*Preparation of a trioxane/3,5-dioxabicyclo(5.4.0) undecane copolymer*

Into a 7-oz. pressure bottle which had been flushed with dry nitrogen were charged 100 g. (1.1 moles) of trioxane, 65 ml. of dry cyclohexane, 4.43 g. (0.0284 mole) of 3,5-dioxabicyclo(5.4.0) undecane and 0.00057 mole of boron fluoride-di-n-butyl ether complex. The bottle was sealed, mixed well by shaking, and heated 30 minutes on a rotating wheel in a water bath at 75° C. The bottle was opened, 1 ml. of triethylamine was added and the polymer was washed from the bottle with acetone and collected on a suction funnel. The polymer was successfully washed with cold water, hot water, and then in a blender with hot water. It was transferred back to the funnel and washed succesively with several portions each of hot water, cold water and finally acetone. The air-dried polymer was then dried overnight in the vacuum oven at 80° C. The air-dried polymer had a melting point of 169–172° C. and a 14.5% per hour loss in the vacuum stability test at 222° C. In comparison to the vacuum stability of this raw (unstabilized) polymer, see Examples 4 and 5.

EXAMPLE 3

The preparation of Example 2 was repeated with the exception that 1.31 g. (0.0084 mole) of 3,5-dioxabicyclo (5.4.0) undecane was used and the reaction time was 5 minutes. The conversion of monomer to polymer was 50%. The dry polymer has a melting point of 175–178° C. and a 25% weight loss in the vacuum stability test at 222° C. for one hour. A sample of this polymer was mixed with 1% by weight of an amide copolymer containing 22 mole percent of the poly-hexamethyleneadipamide) unit with 78 mole percent of the caprolactam unit and 1% by weight of 4,4'-butylidenebis(6-tert-butyl-m-cresol). The mixture was heated one hour at 1–5 mm. at 210° C. This heat treatment apparently volatizes some of the unstable oxymethylene portions of the polymer. The resulting polymer had a weight loss in the 222° C. vacuum stability test of 1.15% after one hour. The 230° C. melt stability ratio was 1.245. It is noted that the lower the melt stability ratio, the more stable the polymer is. The melt flow was 6.4. In comparison to the vacuum stabiilty and melt stabiilty ratio of this heat-treated and stabilized copolymer, see Examples 4 and 6.

EXAMPLE 4

This example illustrates the difference between the copolymers of this invention and simple polyoxymethylene. The preparation of Example 3 was repeated with the exception that 3,5-dioxabicyclo(5.4.0) undecane was not used. The polymer had a melting point of 178–182° C. and a weight loss in the 222° C. vacuum stabiilty test of 58.9% after one hour. This polymer was subjected to the 210° C. heating under vacuum for one hour with the inhibitors employed in Example 3. The vacuum stability test result was 57.2% weight loss after one hour at 222° C. and the melt flow could not be determined due to the instability of the polymer.

EXAMPLE 5

A reaction vessel was charged with 100 g. (1.1 m.) trioxane, 4.6 g. (0.062 m.) dioxolane, 65 ml. dry cyclohexane and 0.000285 m. boron fluoride butyl etherate. The polymerization was carried out with agitation for 2 hours at 75° C. The reaction mixture was quenched with 2 ml. triethylamine and the product was washed with acetone and dried to a constant weight in an air oven at 100° C. The yield of polymer was 75 g., M.P. 167–169° C. The weight loss in the vacuum stability test was 31% during one hour at 222° C.

EXAMPLE 6

A portion of the polymer from Example 5 was mixed with 1% by weight of an amide copolymer containing 22 mole percent of the poly(hexamethyleneadipamide) unit with 78 mole percent of the caprolactam unit and 1% by weight of 4.4'-butylidenebis(6-tert-butyl-m-cresol). This mixture was heated at 210° C. for one hour at 1–5 mm. The resulting polymer had a weight loss in the 222° C. vacuum stability test of 3.1% after one hour and a melt stability ratio of 2.2.

EXAMPLE 7

The preparation of Example 2 was repeated with the exception that 6.74 g. (0.043 mole) of 3,5-dioxybicyclo (5.4.0) undecane was used as was 0.00836 g. (0.00011 mole) of dimethyl formal. The reaction time was 1.5 hours. The dried polymer had a melting point of 166–169° C. and a vacuum stability test result of 17%. An acetylation treatment was used to render this polymer stable. It is noted that other types of acylations may be employed. The dried polymer, 25 g., was placed in a 500-ml. flask with 300 ml. of acid-free acetic anhydride and .03 gram of anhydrous sodium acetate. The mixture was stirred with a magnetic stirrer and was refluxed for 4 hours. After the polymer was separated from the acetic anhydride, it was washed with acetone and water as previously described for the copolymer preparation. The acetylated polymer had a 1.15% weight loss in the vacuum stability test at 222° C. for one hour and a melt flow of 39 at 230° C.

EXAMPLE 8

The preparation of Example 2 was repeated with the exception that 9.80 g. (0.0584 mole) of 3,5-dioxabicyclo- (5.4.0) undecane was used. The reaction time was 1.0 hour. The dried polymer had a melting point of 162–166° C. and a vacuum stability test result of 14.7%. The polymer was stabilized by acetylation to yield a polymer having a 0.75% weight loss in the vacuum stability test at 222° C. for one hour and a melt flow of 6.0 at 230° C.

The following examples illustrate specific uses of the present polymers.

EXAMPLE 9

The preparation of Example 2 was repeated with the exception that 19.0 g. (0.122 m.) of 3,5-dioxabicyclo- (5.4.0) undecane was used. The reaction time was one hour. The dried polymer had a melting point of 155–158° C. and a vacuum stability test result of 10.1%. The polymer was stabilized by acylation with propionic anhydride to yield a polymer having a 0.5% weight loss in the vacuum stability test at 222° C. for one hour.

EXAMPLE 10

The polymer from Example 2 was stabilized as described in Example 3 and was extruded at 190° C. to give fibers which had a tenacity of 8.1 g./d. and an elastic modulus of 66 g./d. after suitable processing.

EXAMPLE 11

The stabilized polymer from Example 10 was extruded to give a tough, glossy, slightly opaque 5-mil. film.

EXAMPLE 12

The stabilized polymer from Example 10 was injection molded to give bars having the following properties:

| | |
|---|---|
| Hardness, Rockwell R | 117 |
| Tensile strength, p.s.i. | 7680 |
| Tensile break strength, p.s.i. | 8820 |
| Elongation, percent | 33 |
| Stiffness, p.s.i. | $2.5 \times 10^5$ |
| Impact, button, in. lb. | 18 |
| 23°, Notched Izod, ft.lb./in. | 1.0 |
| Heat distortion—66 p.s.i., ° C. | 172–177 |

As the above examples illustrate, the present polymers have considerably greater vacuum stability than those of the prior art. In this regard, the present raw (not stabilized by heat or acylation) polymers may be defined as losing less than about 25% of their weight per hour in the vacuum stability test, while the stabilized (heated or acylated) forms may be defined as losing less than about 3.0% of their weight per hour in the same vacuum stability test.

Although the invention has been described in considerable detail with reference to certain preferred embodiments thereof, variations and modifications can be effected within the spirit and scope of this invention as described hereinabove and as defined in the appended claims.

I claim:

1. A copolymer consisting essentially of the units of the formula

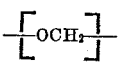

and units of the formula

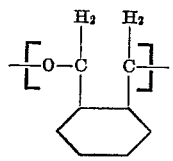

2. A copolymer of from about 90 to about 99.8 mole percent of units of the formula [OCH₂] and reciprocally from about 10 to about 0.2 mole percent of units of the formula

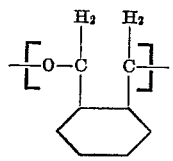

3. A raw copolymer consisting essentially of the units of the formula

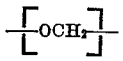

and units of the formula

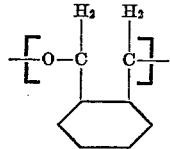

said copolymer losing less than about 25% of its weight per hour at 222° C. and 1–5 mm./hg.

4. A fiber of a copolymer consisting essentially of the units of the formula

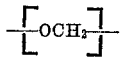

and units of the formula

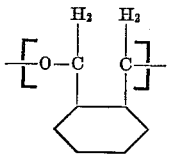

5. A film of a copolymer consisting essentially of the units of the formula

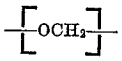

and units of the formula

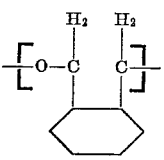

6. A molded article of a copolymer consisting essentially of units of the formula

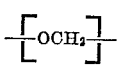

and units of the formula

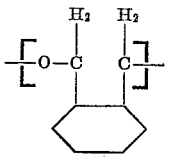

7. A stabilized copolymer of from about 90 to about 99.8 mole percent of units of the formula ‡OCH₂‡ and reciprocally from about 10 to about 0.2 mole percent of units of the formula

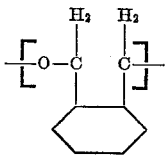

said copolymer losing less than about 3.0% of its weight per hour at 222° C. and 1–5 mm./hg.

8. A fiber of the composition of claim 7.
9. A film of the composition of claim 7.
10. A molded article of the composition of claim 7.
11. The compound 3,5-dioxabicyclo(5.4.0) undecane.

References Cited

UNITED STATES PATENTS

| | | | |
|---|---|---|---|
| 2,968,646 | 1/1961 | Caldwell et al. | 260—67 |
| 3,256,246 | 6/1966 | Gutweiler et al. | 260—67 |

WILLIAM H. SHORT, *Primary Examiner.*

L. M. MILLER, *Assistant Examiner.*